United States Patent
Fujishita et al.

(10) Patent No.: US 10,849,377 B2
(45) Date of Patent: Dec. 1, 2020

(54) GLOVES

(71) Applicant: DIC Corporation, Tokyo (JP)

(72) Inventors: Norie Fujishita, Osaka (JP); Hiroki Tanaka, Osaka (JP); Tomohiro Tetsui, Osaka (JP)

(73) Assignee: DIC CORPORATION, Tokyo (JP)

( * ) Notice: Subject to any disclaimer, the term of this patent is extended or adjusted under 35 U.S.C. 154(b) by 282 days.

(21) Appl. No.: 15/771,072

(22) PCT Filed: Sep. 6, 2016

(86) PCT No.: PCT/JP2016/076115
§ 371 (c)(1),
(2) Date: Apr. 25, 2018

(87) PCT Pub. No.: WO2017/073171
PCT Pub. Date: May 4, 2017

(65) Prior Publication Data
US 2018/0317577 A1 Nov. 8, 2018

(30) Foreign Application Priority Data
Oct. 30, 2015 (JP) .................. 2015-214348

(51) Int. Cl.
| | | |
|---|---|---|
| *A41D 19/00* | (2006.01) | |
| *A41D 19/015* | (2006.01) | |
| *C09D 175/04* | (2006.01) | |
| *C08G 18/32* | (2006.01) | |
| *C08G 18/48* | (2006.01) | |
| *C08G 18/66* | (2006.01) | |
| *C08G 18/76* | (2006.01) | |

(52) U.S. Cl.
CPC ......... *A41D 19/0055* (2013.01); *A41D 19/00* (2013.01); *A41D 19/0006* (2013.01); *A41D 19/0058* (2013.01); *A41D 19/0096* (2013.01); *A41D 19/01505* (2013.01); *C08G 18/3206* (2013.01); *C08G 18/4854* (2013.01); *C08G 18/6674* (2013.01); *C08G 18/7664* (2013.01); *C09D 175/04* (2013.01); *A41D 2500/00* (2013.01); *A41D 2500/54* (2013.01); *A41D 2600/20* (2013.01)

(58) Field of Classification Search
CPC ............ A41D 19/0055; A41D 19/0006; A41D 19/0058; A41D 19/00; A41D 2500/54; A41D 2600/20; A41D 2500/00; A41D 19/01505; A41D 19/0096; C08G 18/7664; C08G 18/6674; C08G 18/4854; C08G 18/3206; C09D 175/04
See application file for complete search history.

(56) References Cited

FOREIGN PATENT DOCUMENTS

| | | |
|---|---|---|
| JP | 5206912 B1 | 6/2013 |
| KP | 10-2011-0051273 A | 5/2011 |
| WO | 2004/041892 A1 | 5/2004 |
| WO | 2013/018478 A1 | 2/2013 |

OTHER PUBLICATIONS

Notification of Reason for Refusal, dated Jun. 3, 2019, issued in corresponding Korean Application No. 10-2018-7010792.
Search Report issued in corresponding International Patent Application No. PCT/JP2016/076115, dated Nov. 22, 2016.
Korean Office Action issued in corresponding Korean Patent Application No. 10-2018-7010792, dated Dec. 4, 2018, with English Translation.

*Primary Examiner* — Rabon A Sergent
(74) *Attorney, Agent, or Firm* — McDermott Will & Emery LLP

(57) ABSTRACT

The present invention provides a glove including a coagulated film of an aqueous polyurethane composition containing anionic polyurethane (A), which has an oxyalkylene group content within a range of 4 to 12 mol/kg and a urea bond content of 0.2 mol/kg or less, and an aqueous medium (B). The anionic polyurethane (A) is preferably the reaction product of polyoxytetramethylene glycol, a glycol having a carboxyl group, ethylene glycol, and diphenylmethane diisocyanate or the reaction product of polyoxytetramethylene glycol, a glycol having a carboxyl group, butanediol, and diphenylmethane diisocyanate. The average particle diameter of the anionic polyurethane (A) is preferably within a range of 0.01 to 1 μm.

6 Claims, No Drawings

GLOVES

CROSS REFERENCE

This application is the U.S. National Phase under 35 U.S.C. § 371 of International Application No. PCT/JP2016/076115, filed on Sep. 6, 2016, which claims the benefit of Japanese Application No. 2015-214348, filed on Oct. 30, 2015, the entire contents of each are hereby incorporated by reference.

TECHNICAL FIELD

The present invention relates to a glove satisfying both wear resistance and flexibility.

BACKGROUND ART

Synthetic rubber and natural rubber, such as cis-1,4-polypropylene and the like, which are generally used as materials having elasticity have a risk of causing allergy by contact, and thus relatively flexible urethane resins having rubber elasticity are widely used for application to gloves.

On the other hand, with the recent influence of the increasing social tendency to demand environmentally conscious products, the change from solvent-type urethane resins to aqueous urethane resins is required also in application to gloves.

Gloves are used for various chemical industrial applications and are thus required to have a high level of wear resistance, not to mention rubber elasticity. It is disclosed that in order to improve the wear resistance, the aromatic ring concentration of aqueous polyurethane is increased, or a urea bond is incorporated into aqueous polyurethane by chain extension with a diamine compound (for example, refer to Patent Literature 1). However, it is pointed out that this method hardens films and thus exhibits poor flexibility.

CITATION LIST

Patent Literature

PTL 1: International Publication No. 2013/018478

SUMMARY OF INVENTION

Technical Problem

A problem to be solved by the present invention is to provide a glove satisfying both wear resistance and flexibility.

Solution to Problem

The present invention provides a glove having a coagulated film of an aqueous polyurethane composition containing an anionic polyurethane (A), which has an oxyalkylene group content within a range of 4 to 12 mol/kg and a urea bond content of 0.2 mol/kg or less, and an aqueous medium (B).

Advantageous Effects of Invention

A glove of the present invention has excellent wear resistance and flexibility and thus can be preferably used in various fields such as the chemical industrial field, the food field, etc.

DESCRIPTION OF EMBODIMENTS

An aqueous polyurethane composition used in the present invention contains an anionic polyurethane (A), which has an oxyalkylene group content within a range of 4 to 12 mol/kg and a urea bond content of 0.2 mol/kg or less, and an aqueous medium (B).

From the view point of obtaining excellent wear resistance and flexibility, the anionic polyurethane (A) is required to have an oxyalkylene group content within a range of 4 to 12 mol/kg and preferably within a range of 5 to 11.5 mol/kg. The oxyalkylene group content exceeding 12 mol/kg decreases the strength of a film and thus causes poor wear resistance, while the oxyalkylene group content lower than 4 mol/kg hardens a film and thus causes poor flexibility.

The oxyalkylene group is supplied from a polyoxyalkylene polyol used as a raw material of the anionic polyurethane (A). The content of the oxyalkylene group of the anionic polyurethane (A) refers to the content of oxyalkylene group supplied from the polyoxyalkylene polyol relative to the total mass of raw materials constituting the anionic polyurethane (A).

From the viewpoint of achieving excellent wear resistance and flexibility, the anionic polyurethane (A) is required to have a urea bond content of 0.2 mol/kg or less and preferably 0.15 mol/kg or less. The urea bond content exceeding 0.2 mol/kg hardens a film due to strengthening of hydrogen bond and thus causes poor wear resistance and flexibility.

The urea bond is produced by reaction with a polyisocyanate when a chain extender having an amino group is used as a raw material of the anionic polyurethane (A) and produced by reaction of the polyisocyanate with an amino group which is produced by reaction of an isocyanate group with water. Therefore, the urea bond content in the anionic polyurethane (A) can be adjusted by adjusting the amount of the chain extender having an amino group used and entirely urethanizing the isocyanate before an emulsification operation. The urea bond content refers to a value calculated by general formula (1) below.

[Math. 1]

$$\text{Urea bond content (mol/kg)} = \frac{\begin{array}{c}(\text{number of moles of amino group}) + \\ (\text{number of moles of isocyanate group} - \\ \text{number of moles of hydroxyl group} - \\ \text{number of moles of amino group})/2\end{array}}{\begin{array}{c}\text{mass of polyol} + \\ \text{mass of glycol having carboxyl group} + \\ \text{mass of polyisocyanate} + \\ \text{mass of chain extender}\end{array}} \quad (1)$$

Specifically, it is possible to use, as the anionic polyurethane (A), the reaction product of a polyol including a polyoxyalkylene polyol, a glycol having a carboxyl group, a chain extender, and a polyisocyanate.

Usable examples of the polyoxyalkylene polyol include polyoxyethylene glycol, polyoxypropylene glycol, polyoxytetramethylene glycol, polyoxyethylene polyoxypropylene glycol, polyoxyethylene polyoxytetramethylene glycol, polyoxypropylene polyoxytetramethylene glycol, and the like. These polyoxyalkylene polyols may be used alone or in combination of two or more. Among these, polyoxytetramethylene glycol is preferably used from the viewpoint of achieving good wear resistance due to high strength.

In view of flexibility and easy production, the number-average molecular weight of the polyoxyalkylene polyol is preferably within a range of 500 to 5,000 and more preferably within a range of 700 to 4,000. The number-average molecular weight of the polyoxyalkylene polyol refers to a value measured by a gel permeation chromatography (GPC) method under the following conditions.

Measurement apparatus: high-speed GPC apparatus ("HLC-8220GPC" manufactured by Tosoh Corporation)

Column: The following columns manufactured by Tosoh Corporation were connected in series and used.

"TSKgel G5000" (7.8 mm I. D.×30 cm)×1
"TSKgel G4000" (7.8 mm I. D.×30 cm)×1
"TSKgel G3000" (7.8 mm I. D.×30 cm)×1
"TSKgel G2000" (7.8 mm I. D.×30 cm)×1

Detector: RI (differential refractometer)
Column temperature: 40° C.
Eluent: tetrahydrofuran (THF)
Flow rate: 1.0 mL/min
Injection amount: 100 μL (tetrahydrofuran solution at a sample concentration of 0.4% by mass)
Standard sample: A calibration curve was formed by using the following standard polystyrene.
(Standard Polystyrene)

"TSKgel standard polystyrene A-500" manufactured by Tosoh Corporation
"TSKgel standard polystyrene A-1000" manufactured by Tosoh Corporation
"TSKgel standard polystyrene A-2500" manufactured by Tosoh Corporation
"TSKgel standard polystyrene A-5000" manufactured by Tosoh Corporation
"TSKgel standard polystyrene F-1" manufactured by Tosoh Corporation
"TSKgel standard polystyrene F-2" manufactured by Tosoh Corporation
"TSKgel standard polystyrene F-4" manufactured by Tosoh Corporation
"TSKgel standard polystyrene F-10" manufactured by Tosoh Corporation
"TSKgel standard polystyrene F-20" manufactured by Tosoh Corporation
"TSKgel standard polystyrene F-40" manufactured by Tosoh Corporation
"TSKgel standard polystyrene F-80" manufactured by Tosoh Corporation
"TSKgel standard polystyrene F-128" manufactured by Tosoh Corporation
"TSKgel standard polystyrene F-288" manufactured by Tosoh Corporation
"TSKgel standard polystyrene F-550" manufactured by Tosoh Corporation If required, the polyoxyalkylene polyol can be used in combination with another polyol as the polyol. Usable examples of the other polyol include polyester polyol, polycarbonate polyol, polyacryl polyol, polybutadiene polyol, and the like. These polyols may be used alone or in combination of two or more. When the other polyol is used, polyester polyol and/or polycarbonate polyol is preferably used in view of good mechanical physical properties.

The glycol having a carboxyl group imparts an anionic group to urethane, and usable examples thereof include 2,2'-dimethylolpropionic acid, 2,2'-dimethylolbutanoic acid, 2,2'-dimethylolbutyric acid, 2,2'-valeric acid, and the like. These compounds may be used alone or in combination of two or more.

The carboxyl group may be partially or entirely neutralized with a basic compound in the aqueous polyurethane composition. Usable examples of the basic compound include organic amines such as ammonia, trimethylamine, pyridine, morpholine, and the like; alkanolamines such as monoethanolamine and the like; metal basic compounds containing sodium, potassium, lithium, calcium, or the like; and the like.

The chain extender has a number-average molecular weight within a range of 50 to 450, and usable examples thereof include chain extenders each having an amino group, such as ethylenediamine, 1,2-propanediamine, 1,6-hexamethylenediamine, piperazine, 2,5-dimethylpiperazine, isophoronediamine, 1,2-cyclohexanediamine, 1,3-cyclohexanediamine, 1,4-cyclohexanediamine, 4,4'-dicyclohexylmethanediamine, 3,3'-dimethyl-4,4'-dicyclohexylmethanediamine, hydrazine, and the like; chain extenders each having a hydroxyl group, such as ethylene glycol, diethylene glycol, triethylene glycol, propylene glycol, dipropylene glycol, 1,3-propanediol, 1,3-butanediol, 1,4-butanediol, hexamethylene glycol, saccharose, methylene glycol, glycerin, sorbitol, bisphenol A, 4,4'-dihydroxydiphenyl, 4,4'-dihydroxydiphenyl ether, trimethylolpropane, and the like; and the like. These chain extenders may be used alone or in combination of two or more. Among these, a chain extender having a hydroxyl group is preferably used from the viewpoint of preventing hardening of a coagulated film and achieving excellent wear resistance ad flexibility, and ethylene glycol or butanediol is more preferably used from the viewpoint of forming a hard segment having a proper chain length and achieving more excellent wear resistance and flexibility. From the viewpoint of achieving better wear resistance by crystallization, the amount of the chain extender used is preferably within a range of 0.01% to 8% by mass and more preferably within a range of 0.01% to 5% by mass of the total mass of the raw materials of the anionic polyurethane (A).

Usable examples of the polyisocyanate include aromatic polyisocyanates such as phenylene diisocyanate, toluene diisocyanate, diphenylmethane diisocyanate, naphthalene diisocyanate, polymethylene polyphenyl polyisocyanate, carbodiimidated diphenylmethane polyisocyanate, and the like; aliphatic or alicyclic polyisocyanates such as hexamethylene diisocyanate, lysine diisocyanate, cyclohexane diisocyanate, isophorone diisocyanate, dicyclohexylmethane diisocyanate, xylylene diisocyanate, tetramethylxylylene diisocyanate, dimer acid diisocyanate, norbornene diisocyanate, and the like; and the like. These polyisocyanates may be used alone or in combination of two or more. Among these, an aromatic polyisocyanate is preferably used from the viewpoint of achieving excellent wear resistance and flexibility, and diphenylmethane diisocyanate or toluene diisocyanate is more preferably used and diphenylmethane diisocyanate is still more preferably used from the viewpoint of forming a hard segment having a proper chain length and achieving more excellent wear resistance and flexibility.

The anionic polyurethane (A) can be produced by, for example, mixing the polyol, the glycol having a carboxyl group, the chain extender, and the polyisocyanate without a solvent or in the presence of an organic solvent, and performing urethanization reaction at a reaction temperature of, for example, 50° C. to 100° C. for 3 to 10 hours.

The anionic polyurethane (A) can also be produced by, for example, mixing the polyol, the glycol having a carboxyl group, and the polyisocyanate without a solvent or in the presence of an organic solvent, performing reaction at a reaction temperature of, for example, 50° C. to 100° C. for 3 to 10 hours to produce a urethane prepolymer having an isocyanate group at its molecular end, and then reacting the urethane prepolymer with the chain extender.

The [isocyanate group/hydroxyl group] (molar ratio) in the reaction of the polyol, the glycol having a carboxyl group, the chain extender, and the polyisocyanate is preferably within a range of 0.9 to 1.1 and more preferably within a range of 0.93 to 1.05.

Examples of an organic solvent which can be used for producing the anionic polyurethane (A) include ketone solvents such as acetone, methyl ethyl ketone, and the like; ether solvents such as tetrahydrofuran, dioxane, and the like; ester solvents such as ethyl acetate, butyl acetate, and the like; nitrile solvents such as acetonitrile and the like; amide solvents such as dimethylformamide, N-methylpyrrolidone, and the like; and the like. The organic solvents may be used alone or in combination of two or more.

From the viewpoint of preventing the formation of precipitates and thus achieving excellent product stability, the average particle diameter of the anionic polyurethane (A) is preferably within a range of 0.01 to 1 μm and more preferably within a range of 0.05 to 0.9 μm. A method for measuring the average particle diameter of the anionic polyurethane (A) is described in examples later.

From the viewpoint of achieving excellent flexibility and wear resistance, the weight-average molecular weight of the anionic polyurethane (A) is preferably within a range of 10,000 to 1,000,000 and more preferably within a range of 30,000 to 500,000. The weight-average molecular weight of the anionic polyurethane (A) refers to a value measured by the same method as for the number-average molecular weight of the polyoxyalkylene polyol.

From the viewpoint of achieving excellent flexibility and wear resistance, the urethane bond content in the anionic polyurethane (A) is preferably within a range of 500 mmol/kg to 3,500 mmol/kg and more preferably within a range of 700 mmol/kg to 3,000 mmol/kg relative to the whole of the anionic polyurethane (A). The urethane bond content in the anionic polyurethane (A) refers to the content of a urethane bond structure in raw materials relative to the total mass of the raw materials constituting the anionic polyurethane (A).

From the viewpoint of achieving excellent wear resistance, the aromatic ring content in the anionic polyurethane (A) is preferably within a range of 550 mmol/kg to 2,500 mmol/kg and more preferably within a range of 800 mmol/kg to 2200 mmol/kg relative to the whole of the anionic polyurethane W. The aromatic ring content in the anionic polyurethane (A) refers to the content of an aromatic ring in raw materials relative to the total mass of the raw materials constituting the anionic polyurethane (A). In calculation, the molecular weight of each of a benzene ring and naphthalene ring, excluding an organic group, is used as the molecular weight of an aromatic ring. For example, in the case of toluene, the molecular weight of a benzene ring having 5 hydrogen atoms excluding a methyl group is used; in the case of diphenylmethane diisocyanate, the molecular weight of a benzene ring having four hydrogen atoms excluding an isocyanate group and a methylene group is used; and in the case of tolylene diisocyanate, the molecular weight of a benzene ring having four hydrogen atoms excluding two methyl groups is used.

From the viewpoint of achieving good viscosity and coating workability, the content of the anionic polyurethane (A) in the aqueous polyurethane composition is preferably within a range of 10% to 60% by mass and more preferably within a range of 20% to 50% by mass in the aqueous polyurethane composition.

For example, water, an organic solvent miscible with water, and a mixture thereof can be used as the aqueous medium (B). Examples of the organic solvent miscible with water include alcohol solvents such as methanol, ethanol, n-propanol, isopropanol, and the like; ketone solvents such as acetone, methyl ethyl ketone, and the like; polyalkylene glycol such as ethylene glycol, diethylene glycol, propylene glycol, and the like; polyalkylene polyol alkyl ether solvents; lactame solvents such as N-methyl-2-pyrrolidone and the like; and the like. Among these, water is preferably used from the viewpoint of environmental friendliness.

A method for producing the aqueous polyurethane composition is, for example, a method of producing the anionic polyurethane (A) without a solvent or in the presence of the organic solvent, then neutralizing carboxyl groups in the anionic polyurethane (A) if required, supplying the aqueous medium (B), and dispersing the anionic polyurethane (A) in the aqueous medium (B).

In mixing the anionic polyurethane (A) with the aqueous medium (B), if required, a machine such as a homogenizer or the like may be used.

Also, in producing the aqueous polyurethane composition, an emulsifier may be used from the viewpoint of improving dispersion stability of the anionic polyurethane (A) in the aqueous medium (B).

Usable examples of the emulsifier include nonionic emulsifiers such as polyoxyethylene nonyl phenyl ether, polyoxyethylene lauryl ether, polyoxyethylene styryl phenyl ether, polyoxyethylene sorbitol tetraolerate, polyoxyethylene-polyoxypropylene copolymer and the like; anionic emulsifiers such as fatty acid salts, such as sodium oleate and the like, alkylsulfate ester salts, alkylbenzenesulfonic acid salts, alkylsulfosuccinic acid salts, naphthalenesulfonic acid salts, polyoxyethylenealkylsulfuric acid salts, alkanesulfonate sodium salts, alkyl diphenyl ether sulfonate sodium salt, and the like; cationic emulsifiers such as alkyl amine salts, alkyltrimethyl ammonium salts, alkyldimethylbenzyl ammonium salts, and the like; and the like. These emulsifiers may be used alone or in combination of two or more.

From the viewpoint of obtaining excellent production stability, the acid value of the aqueous polyurethane composition is preferably within a range of 5 to 19 mgKOH/g and more preferably within a range of 7 to 14 mgKOH/g. A method for measuring the acid vale of the aqueous polyurethane composition is described in examples described later.

The aqueous polyurethane composition contains the anionic polyurethane (A) and the aqueous medium (B), and may further contain other additives, if required.

Usable examples of the additives include an associative thickener, a defoaming agent, a urethanization catalyst, a silane coupling agent, a filler, a thixotropy-imparting agent, an adhesion-imparting agent, a wax, a heat stabilizer, a light-resistant stabilizer, a fluorescent brightener, a foaming agent, a pigment, a dye, an antistatic agent, a moisture-permeability improver, a water repellent agent, an oil repellent agent, a flame retardant, an anti-blocking agent, a hydrolysis inhibitor, and the like. These additives may be used alone or in combination of two or more.

The associative thickener can be preferably used for adjusting the viscosity of the aqueous polyurethane composition and facilitating the work of salt coagulation. Usable examples thereof include cellulose derivatives such as hydroxyethyl cellulose, methyl cellulose, carboxymethyl cellulose, and the like; polyacrylic acid salts; polyvinylpyrrolidone; urethane compounds; polyether compounds; and the like. When the associative emulsifier is used, the use amount is, for example, within a range of 0.5 to 5 parts by mass relative to 100 parts by mass of the anionic polyurethane (A).

Usable examples of the defoaming agent include defoaming agents such as silicone compounds, mineral oil compounds, polyglycol ether compounds, fatty acid ester compounds, metal soaps, fluorine compounds, and the like. These defoaming agents may be used alone or in combination of two or more.

The aqueous polyurethane composition used in the present invention can be used for producing, besides gloves, medical tubes, specifically tubes such as a catheter and the like, contraceptive devices such as a condom and the like.

A method for producing a coagulated film by using the aqueous polyurethane composition is, for example, a method of applying the aqueous polyurethane composition on a surface of a mold-release film, next immersing the coated material in a predetermined coagulant, and then drying the coated material.

Examples of the method for applying the aqueous polyurethane composition on a mold-release film or the like include a knife coater method, a spray method, a curtain coater method, a flow coater method, a roll coater method, a brushing method, and the like. During coating, the viscosity of the aqueous polyurethane composition is preferably within a range of 50 to 10,000 mPa·s and more preferably within a range of 1,000 to 3,000 mPa·s. The viscosity of the aqueous polyurethane composition refers to a value measured by a B-type viscometer (40P cone) at 25° C.

Usable examples of the coagulant in which the coated material of the aqueous polyurethane composition is immersed include metal salt solutions of calcium nitrate, calcium chloride, zinc nitrate, zinc chloride, magnesium acetate, aluminum sulfate, sodium chloride, and the like; acid solutions of formic acid, acetic acid, and the like; and the like. Usable examples of a solvent which can dissolve the metal salts and acids include water, methanol, ethanol, isopropanol, and the like. The metal salt contained in the coagulant is preferably contained within a range of 1% to 50% by mass relative to the total amount of the coagulant. In addition, the time taken to immerse the coated material in the coagulant is preferably 1 to 10 minutes, and the coagulant is preferably used at a temperature of 5° C. to 60° C.

After the immersion, the coated material is dried at a temperature of, for example, 50° C. to 150° C. for 1 minute to 1 hour to form the coagulated film coagulated on the surface of the mold-release film.

The 100% modulus obtained by a tensile test of the coagulated film under the condition of a crosshead speed of 300 mm/min is preferably 6 MPa or less and more preferably within a range of 0.1 to 4 MPa from the viewpoint of achieving excellent flexibility.

The 300% modulus obtained by a tensile test of the coagulated film under the condition of a crosshead speed of 300 mm/min is preferably 14 MPa or less and more preferably within a range of 0.1 to 12 MPa from the viewpoint of achieving excellent flexibility.

When a glove is produced by using the coagulated film, first a hand mold, a tube mold, or the like is immersed in the coagulant and then, if required, dried, thereby adhering a metal salt or the like in the coagulant to the surface of the hand mold or the like. Next, the hand mold or the like is immersed in the aqueous polyurethane composition, and then the surface thereof is washed with water and dried to form the coagulated film on the hand mold or the like. Next, a glove having the coagulated film with the same shape as the hand mold can be produced by separating the coagulated film from the hand mold. Also, in producing a tube, it can be produced by the same method as described above except using the tube mold.

The hand mold or the tube mold may be at room temperature or may be heated to, for example, 30° C. to 70° C., before being immersed in the coagulant. Also, like with the hand mold or the like, the coagulant may be at room temperature, but when the hand mold or the like is heated, the coagulant may be heated to, for example, 30° C. to 70° C.

Also, the hand mold or tube mold may be previously provided with a glove-shaped material or tube-shaped material composed of a knit of nylon fibers or the like. Specifically, the hand mold or the like provided with the glove-shaped material or the like composed of a knit is first immersed in the coagulant, and then the glove-shaped material or the like is impregnated with the coagulant by drying if required. Next, the hand mold or the like is immersed in the aqueous polyurethane composition, and the surface thereof is washed with water and dried to form a glove or the like composed of a film coagulated on the surface of the glove-shaped material or the like. The glove including the coagulated film having a shape corresponding to the hand mold or the like can be produced by separating the glove or the like from the hand mold and the glove-shaped material or the like. In producing the tube mold, the tube can be produced by the same method as described above except using the tube mold and the tube-shaped material composed of a knit of nylon fibers or the like.

The knit is not limited to that composed of the nylon fibers, and a knit composed of polyester fibers, aramid fibers, cotton, or the like can also be used. Also, a fabric composed of the fibers may be used in place of the knit. In addition, a glove-shaped material or tube-shaped material composed of vinyl chloride, natural rubber, synthetic rubber, or the like can be used in place of the knit.

From the viewpoint of achieving excellent wear resistance, the number of times of abrasion performed on the glove according to EN388:2004 is preferably within a range of 2,000 or more, more preferably within a range of 5,000 to 20,000, and still more preferably within a range of 8,000 to 10,000.

From the above, the glove of the present invention has excellent wear resistance and flexibility and thus can be preferably used in various fields such as the chemical industrial field, the food field, etc.

EXAMPLES

The present invention is described in further detail by using examples below.

[Preparation Example 1] Preparation of Aqueous Polyurethane Composition (X-1)

In a nitrogen-purged vessel provided with a thermometer, a nitrogen gas inlet tube, and a stirrer, reaction was performed at 70° C. in the presence of 895.3 parts by mass of the polyoxytetramethylene glycol (number-average molecular weight: 2,000, abbreviated as "PTMG2000" hereinafter), 18 parts by mass of ethylene glycol (abbreviated as "EG" hereinafter), 25.5 parts by mass of 2,2'-dimethylolpropanic acid (abbreviated as "DMPA" hereinafter), 224 parts by mass of diphenylmethane diisocyanate (abbreviated as "MDI" hereinafter), and 487 parts by mass of methyl ethyl ketone.

When the reaction product reached a specified viscosity, 2.9 parts by mass of methanol was added and stirred for 1 hour, and then the reaction was terminated. Further, 1257 parts by mass of methyl ethyl ketone as a diluting solvent was added to produce an organic solvent solution of anionic polyurethane.

Next, 19.2 parts by mass of triethylamine as a neutralizer was added to the anionic polyurethane organic solvent solution and stirred, and further 3638 parts by mass of water was added and stirred to produce a water dispersion of anionic polyurethane. Next, the solvent was removed from the water dispersion to produce an aqueous polyurethane composition (X-1) having a nonvolatile content of 40% by mass and an acid value 9.2 mgKOH/g. The anionic polyurethane had an oxyalkylene group content of 10.7 mol/kg and an average particle diameter of 0.25 μm.

[Preparation Example 2] Preparation of Aqueous Polyurethane Composition (X-2)

In a nitrogen-purged vessel provided with a thermometer, a nitrogen gas inlet tube, and a stirrer, reaction was performed at 70° C. in the presence of 764.5 parts by mass of PTMG2000, 18.9 parts by mass of butanediol (abbreviated as "BG" hereinafter), 23.1 parts by mass of DMPA, 190.8 parts by mass of MDI, and 417.5 parts by mass of methyl ethyl ketone.

When the reaction product reached a specified viscosity, 2.5 parts by mass of methanol was added and stirred for 1 hour, and then the reaction was terminated. Further, 1078.4 parts by mass of methyl ethyl ketone as a diluting solvent was added to produce an organic solvent solution of anionic polyurethane.

Next, 17.4 parts by mass of triethylamine as a neutralizer was added to the anionic polyurethane organic solvent solution and stirred, and further 3200 parts by mass of water was added and stirred to produce a water dispersion of anionic polyurethane. Next, the solvent was removed from the water dispersion to produce an aqueous polyurethane composition (X-2) having a nonvolatile content of 40% by mass and an acid value 9.7 mgKOH/g. The anionic polyurethane had an oxyalkylene group content of 10.6 mol/kg and an average particle diameter of 0.14 μm.

[Preparation Example 3] Preparation of Aqueous Polyurethane Composition (X-3)

In a nitrogen-purged vessel provided with a thermometer, a nitrogen gas inlet tube, and a stirrer, reaction was performed at 70° C. in the presence of 354.3 parts by mass of the polyoxytetramethylene glycol (number-average molecular weight: 700, abbreviated as "PTMG700" hereinafter), 8.6 parts by mass of EG, 16.7 parts by mass of DMPA, 190.8 parts by mass of MDI, and 237.3 parts by mass of methyl ethyl ketone.

When the reaction product reached a specified viscosity, 2.7 parts by mass of methanol was added and stirred for 1 hour, and then the reaction was terminated. Further, 618 parts by mass of methyl ethyl ketone as a diluting solvent was added to produce an organic solvent solution of anionic polyurethane.

Next, 12.6 parts by mass of triethylamine as a neutralizer was added to the anionic polyurethane organic solvent solution and stirred, and further 1785 parts by mass of water was added and stirred to produce a water dispersion of anionic polyurethane. Next, the solvent was removed from the water dispersion to produce an aqueous polyurethane composition (X-3) having a nonvolatile content of 40% by mass and an acid value 12.3 mgKOH/g. The anionic polyurethane had an oxyalkylene group content of 8.6 mol/kg and an average particle diameter of 0.39 μm.

[Preparation Example 4] Preparation of Aqueous Polyurethane Composition (X-4)

In a nitrogen-purged vessel provided with a thermometer, a nitrogen gas inlet tube, and a stirrer, reaction was performed at 70° C. in the presence of 1127.3 parts by mass of polyoxytetramethylene glycol (number-average molecular weight: 4,000, abbreviated as "PTMG4000" hereinafter), 10.3 parts by mass of EG, 44.5 parts by mass of DMPA, 190.8 parts by mass of MDI, and 569 parts by mass of methyl ethyl ketone.

When the reaction product reached a specified viscosity, 2.6 parts by mass of methanol was added and stirred for 1 hour, and then the reaction was terminated. Further, 1490 parts by mass of methyl ethyl ketone as a diluting solvent was added to produce an organic solvent solution of anionic polyurethane.

Next, 33.5 parts by mass of triethylamine as a neutralizer was added to the anionic polyurethane organic solvent solution and stirred, and further 4293 parts by mass of water was added and stirred to produce a water dispersion of anionic polyurethane. Next, the solvent was removed from the water dispersion to produce an aqueous polyurethane composition (X-4) having a nonvolatile content of 40% by mass and an acid value 13.5 mgKOH/g. The anionic polyurethane had an oxyalkylene group content of 11.4 mol/kg and an average particle diameter of 0.43 μm.

[Preparation Example 5] Preparation of Aqueous Polyurethane Composition (X-5)

In a nitrogen-purged vessel provided with a thermometer, a nitrogen gas inlet tube, and a stirrer, reaction was performed at 70° C. in the presence of 391.1 parts by mass of PTMG2000, 26.7 parts by mass of EG, 15.7 parts by mass of DMPA, 190.8 parts by mass of MDI, and 261 parts by mass of methyl ethyl ketone.

When the reaction product reached a specified viscosity, 2.1 parts by mass of methanol was added and stirred for 1 hour, and then the reaction was terminated. Further, 675.6 parts by mass of methyl ethyl ketone as a diluting solvent was added to produce an organic solvent solution of anionic polyurethane.

Next, 11.8 parts by mass of triethylamine as a neutralizer was added to the anionic polyurethane organic solvent solution and stirred, and further 1953.4 parts by mass of water was added and stirred to produce a water dispersion of anionic polyurethane. Next, the solvent was removed from the water dispersion to produce an aqueous polyurethane composition (X-5) having a nonvolatile content of 40% by mass and an acid value 10.5 mgKOH/g. The anionic polyurethane had an oxyalkylene group content of 8.7 mol/kg and an average particle diameter of 0.42 μm.

[Preparation Example 6] Preparation of Aqueous Polyurethane Composition (X-6)

In a nitrogen-purged vessel provided with a thermometer, a nitrogen gas inlet tube, and a stirrer, reaction was performed at 70° C. in the presence of 458.7 parts by mass of PTMG2000, 305.8 parts by mass of polyester polyol (produced by reacting 1,6-hexanediol, neopentyl glycol, and adipic acid, number-average molecular weight: 2,000, abbreviated as "PEs" hereinafter), 11.8 parts by mass of EG, 28.2 parts by mass of DMPA, 190.8 parts by mass of MDI, and 414.5 parts by mass of methyl ethyl ketone.

When the reaction product reached a specified viscosity, 2.2 parts by mass of methanol was added and stirred for 1 hour, and then the reaction was terminated. Further, 1078.5 parts by mass of methyl ethyl ketone as a diluting solvent was added to produce an organic solvent solution of anionic polyurethane.

Next, 21.3 parts by mass of triethylamine as a neutralizer was added to the anionic polyurethane organic solvent solution and stirred, and further 3113.2 parts by mass of water was added and stirred to produce a water dispersion of anionic polyurethane. Next, the solvent was removed from the water dispersion to produce an aqueous polyurethane composition (X-6) having a nonvolatile content of 40% by mass and an acid value 11.8 mgKOH/g. The anionic polyurethane had an oxyalkylene group content of 6.4 mol/kg and an average particle diameter of 0.13 μm.

[Preparation Example 7] Preparation of Aqueous Polyurethane Composition (X-7)

In a nitrogen-purged vessel provided with a thermometer, a nitrogen gas inlet tube, and a stirrer, reaction was performed at 70° C. in the presence of 1151 parts by mass of PTMG2000, 17.8 parts by mass of EG, 42.4 parts by mass of DMPA, 200 parts by mass of toluene diisocyanate (abbreviated as "TDI" hereinafter), and 586.6 parts by mass of methyl ethyl ketone.

When the reaction product reached a specified viscosity, 3.9 parts by mass of methanol was added and stirred for 1 hour, and then the reaction was terminated. Further, 1530.3 parts by mass of methyl ethyl ketone as a diluting solvent was added to produce an organic solvent solution of anionic polyurethane.

Next, 32 parts by mass of triethylamine as a neutralizer was added to the anionic polyurethane organic solvent solution and stirred, and further 4415 parts by mass of water was added and stirred to produce a water dispersion of anionic polyurethane. Next, the solvent was removed from the water dispersion to produce an aqueous polyurethane composition (X-7) having a nonvolatile content of 40% by mass and an acid value 12.6 mgKOH/g. The anionic polyurethane had an oxyalkylene group content of 11.3 mol/kg and an average particle diameter of 0.19 μm.

[Preparation Example 8] Preparation of Aqueous Polyurethane Composition (X-8)

In a nitrogen-purged vessel provided with a thermometer, a nitrogen gas inlet tube, and a stirrer, reaction was performed at 70° C. in the presence of 601 parts by mass of PTMG2000, 200 parts by mass of polycarbonate polyol ("UH-200" manufactured by Ube Industries, Ltd., abbreviated as "PC" hereinafter), 9.9 parts by mass of EG, 32.2 parts by mass of DMPA, 200 parts by mass of MDI, and 433.4 parts by mass of methyl ethyl ketone.

When the reaction product reached a specified viscosity, 2.2 parts by mass of methanol was added and stirred for 1 hour, and then the reaction was terminated. Further, 1131.9 parts by mass of methyl ethyl ketone as a diluting solvent was added to produce an organic solvent solution of anionic polyurethane.

Next, 24.3 parts by mass of triethylamine as a neutralizer was added to the anionic polyurethane organic solvent solution and stirred, and further 3263.8 parts by mass of water was added and stirred to produce a water dispersion of anionic polyurethane. Next, the solvent was removed from the water dispersion to produce an aqueous polyurethane composition (X-8) having a nonvolatile content of 40% by mass and an acid value 12.9 mgKOH/g. The anionic polyurethane had an oxyalkylene group content of 8.0 mol/kg and an average particle diameter of 0.32 μm.

[Preparation Example 9] Preparation of Aqueous Polyurethane Composition (X-9)

In a nitrogen-purged vessel provided with a thermometer, a nitrogen gas inlet tube, and a stirrer, reaction was performed at 70° C. in the presence of 863.2 parts by mass of PTMG2000, 287.7 parts by mass of PEs, 25.9 parts by mass of BG, 42.4 parts by mass of DMPA, 200 parts by mass of TDI, and 590.1 parts by mass of methyl ethyl ketone.

When the reaction product reached a specified viscosity, 3.1 parts by mass of methanol was added and stirred for 1 hour, and then the reaction was terminated. Further, 1538.9 parts by mass of methyl ethyl ketone as a diluting solvent was added to produce an organic solvent solution of anionic polyurethane.

Next, 32.0 parts by mass of triethylamine as a neutralizer was added to the anionic polyurethane organic solvent solution and stirred, and further 4439.3 parts by mass of water was added and stirred to produce a water dispersion of anionic polyurethane. Next, the solvent was removed from the water dispersion to produce an aqueous polyurethane composition (X-9) having a nonvolatile content of 40% by mass and an acid value 12.5 mgKOH/g. The anionic polyurethane had an oxyalkylene group content of 8.4 mol/kg and an average particle diameter of 0.24 μm.

[Comparative Preparation Example 1] Preparation of Aqueous Polyurethane Composition (X'-1)

In a nitrogen-purged vessel provided with a thermometer, a nitrogen gas inlet tube, and a stirrer, reaction was performed at 70° C. in the presence of 1836.8 parts by mass of PTMG4000, 1.9 parts by mass of EG, 34.9 parts by mass of DMPA, 180 parts by mass of MDI, and 865.2 parts by mass of methyl ethyl ketone.

When the reaction product reached a specified viscosity, 2.8 parts by mass of methanol was added and stirred for 1 hour, and then the reaction was terminated. Further, 2215.3 parts by mass of methyl ethyl ketone as a diluting solvent was added to produce an organic solvent solution of anionic polyurethane.

Next, 26.3 parts by mass of triethylamine as a neutralizer was added to the anionic polyurethane organic solvent solution and stirred, and further 6421 parts by mass of water was added and stirred to produce a water dispersion of anionic polyurethane. Next, the solvent was removed from the water dispersion to produce an aqueous polyurethane composition (X'-1) having a nonvolatile content of 40% by mass and an acid value 7.1 mgKOH/g. The anionic polyurethane had an oxyalkylene group content of 12.4 mol/kg and an average particle diameter of 0.57 μm.

[Comparative Preparation Example 2] Preparation of Aqueous Polyurethane Composition (X'-2)

In a nitrogen-purged vessel provided with a thermometer, a nitrogen gas inlet tube, and a stirrer, reaction was performed at 70° C. in the presence of 179.9 parts by mass of PTMG2000, 539.6 parts by mass of PEs, 11.2 parts by mass of EG, 26.5 parts by mass of DMPA, 180 parts by mass of MDI, and 390.2 parts by mass of methyl ethyl ketone.

When the reaction product reached a specified viscosity, 2.3 parts by mass of methanol was added and stirred for 1 hour, and then the reaction was terminated. Further, 1015.4 parts by mass of methyl ethyl ketone as a diluting solvent was added to produce an organic solvent solution of anionic polyurethane.

Next, 20.0 parts by mass of triethylamine as a neutralizer was added to the anionic polyurethane organic solvent solution and stirred, and further 2931.3 parts by mass of water was added and stirred to produce a water dispersion of anionic polyurethane. Next, the solvent was removed from the water dispersion to produce an aqueous polyurethane composition (X'-2) having a nonvolatile content of 40% by mass and an acid value 11.84 mgKOH/g. The anionic polyurethane had an oxyalkylene group content of 2.7 mol/kg and an average particle diameter of 0.67 μm.

[Comparative Preparation Example 3] Preparation of Aqueous Polyurethane Composition (X'-3)

In a nitrogen-purged vessel provided with a thermometer, a nitrogen gas inlet tube, and a stirrer, reaction was performed at 70° C. in the presence of 581.4 parts by mass of PTMG2000, 9.0 parts by mass of EG, 21.4 parts by mass of DMPA, 200 parts by mass of MDI, and 1243.7 parts by mass of methyl ethyl ketone. When the reaction product reached a specified NCO %, the reaction was terminated to produce an organic solvent solution of anionic polyurethane. Next, 16.2 parts by mass of triethylamine as a neutralizer was added to the anionic polyurethane organic solvent solution and stirred, and further 2572.4 parts by mass of water and 17.4 parts by mass of piperazine (abbreviated as "PZ" hereinafter) were added and stirred to produce a water dispersion of anionic polyurethane. Next, the solvent was removed from the water dispersion to produce an aqueous polyurethane composition (X'-3) having a nonvolatile content of 40% by mass and an acid value 10.8 mgKOH/g. The anionic polyurethane had an oxyalkylene group content of 9.7 mol/kg, a urea bond content of 0.24 mol/kg, and an average particle diameter of 0.83 μm.

Example 1

A knit glove composed of nylon fibers was placed on a hand mold, immersed in an aqueous potassium nitrate solution adjusted to a concentration of 5% by mass at room temperature for 10 seconds, and then pulled out. Next, the hand mold was immersed in the aqueous polyurethane composition (X-1) for 2 seconds to form a coagulated film of the anionic polyurethane on the surface of the knit glove, and then pulled out. Next, the hand mold was immersed in water for 180 minutes and then pulled out. Further, the hand mold was dried in an environment of 70° C. for 20 minutes and further dried in an environment of 120° C. for 30 minutes. Then, the knit glove was separated from the hand mold to produce a glove coated with the coagulated film.

Examples 2 to 9 and Comparative Examples 1 to 3

Gloves were produced by the same method as in Example 1 except that the aqueous polyurethane composition used was changed as shown in Tables 1 and 2.

[Method for Measuring Average Particle Diameter of Anionic Polyurethane (A)]

The area-based average particle diameter of the aqueous polyurethane composition produced in each of the preparation examples was measured with relative refractive index=1.10 by using a laser diffraction/scattering particle size distribution analyzer ("LA-910" manufactured by HORIBA, Ltd.) and water as a dispersing liquid.

[Method for Measuring Acid Value of Aqueous Polyurethane Composition]

The aqueous polyurethane composition produced in each of the preparation examples was dried, and 0.05 g to 0.5 g of dry solidified resin particles was weighed in a 300-mL conical flask. Then, about 80 mL of a mixed solvent of tetrahydrofuran and ion exchange water at a mass ratio [tetrahydrofuran/ion exchange water] of 80/20 was added to the resin particles to produce a mixed solution.

Next, the mixed solution was mixed with a phenolphthalein indicator and titrated with a 0.1 mol/L aqueous potassium hydroxide solution which had been previously standardized. The acid value (mgKOH/g) of the aqueous polyurethane composition was determined from the amount of the aqueous potassium hydroxide solution used in titration according to a calculation formula (2) below.

$$A = (B \times f \times 5.611)/S \quad (2)$$

In the formula, A is the acid value (mgKOH/g) of resin solid content, B is the amount (mL) of the 0.1 mol/L aqueous potassium hydroxide solution used in titration, f is the factor of the 0.1 mol/L aqueous potassium hydroxide solution, S is the mass (g) of resin particles, and 5.611 is the formula weight (56.11/10) of potassium hydroxide.

[Method for Evaluating Flexibility]

Flexibility was evaluated by using a coagulated film.

An associative thickener "Hydran Assister T10" (manufactured by DIC Corporation) was mixed with 100 parts by mass of the aqueous polyurethane composition prepared in each of the preparation examples, and the resultant mixture was adjusted so that the viscosity was 1,000 to 3,000 mPa·s. Then, 150 g/cm$^2$ of the mixture was applied on the surface of a mold release-treated polypropylene film at room temperature by a knife coater method.

The coated material was immersed for 3 minutes in an aqueous calcium nitrate solution at room temperature, which was adjusted to a concentration of 5% by mass, and then immersed in water for 18 hours. Next, the coated material was dried in an environment of 70° C. for 20 minutes and further dried in an environment of 120° C. for 2 minutes, thereby forming a coagulated film on the surface of the polypropylene film. After drying, the coagulated film was separated from the surface of the polypropylene film to produce the coagulated film having a thickness of 50 μm.

The resultant coagulated film was cut into a length of 100 mm and a width of 5 mm to form a test piece. The test piece was held between chucks at both ends thereof and stretched by using a tensile tester [Autograph AG-1] (manufactured by Shimadzu Corporation) in an atmosphere at a temperature of 23° C. and a humidity of 60% at a crosshead speed of 300 mm/min, measuring 100% modulus and 300% modulus (MPa) of the test piece. In this test, the distance between reference lines was 20 mm, and the initial distance between the chucks was 20 mm.

The flexibility was evaluated from the obtained 100% modulus value and 300% modulus value according to the following criteria "A": The 100% modulus is 6 MPa or less and the 300% modulus value is 14 MPa or less.

"B": These criteria are not satisfied.

[Method for Evaluating Wear Resistance]

A wear test of the palm portion of the glove produced in each of the examples and comparative examples was carried out by using a Martindale abrasion tester manufactured by Intec Inc. according to EN388:2004 and the following criteria.

"A": Number of times of abrasion is 5,000 or more and less than 20,000.

"B": Number of times of abrasion is 2,000 or more and less than 5,000.

"C": Number of times of abrasion is less than 2,000.

It was found that the glove of the present invention has excellent wear resistance and flexibility.

On the other hand, Comparative Example 1 has conditions in which the oxyalkylene group content exceeds the range specified in the present invention, and poor wear resistance is exhibited.

Comparative Example 2 has conditions in which the oxyalkylene group content is lower than the range specified in the present invention, and poor flexibility is exhibited.

Comparative Example 3 has conditions in which the urea bond content exceeds the range specified in the present invention, and poor flexibility is exhibited.

The invention claimed is:

1. A glove comprising a coagulated film of an aqueous polyurethane composition containing anionic polyurethane (A), which has an oxyalkylene group content within a range

TABLE 1

|  | Example 1 | Example 2 | Example 3 | Example 4 | Example 5 | Example 6 |
|---|---|---|---|---|---|---|
| Aqueous polyurethane composition | (X-1) | (X-2) | (X-3) | (X-4) | (X-5) | (X-6) |
| Acid value (mgKOH/g) Anionic polyurethane (A) | 9.2 | 9.7 | 12.3 | 13.5 | 10.5 | 11.8 |
| Composition | PTMG2000 | PTMG2000 | PTMG700 | PTMG4000 | PTMG2000 | PTMG2000 PEs |
|  | DMPA | DMPA | DMPA | DMPA | DMPA | DMPA |
|  | EG | BG | EG | EG | EG | EG |
|  | MDI | MDI | MDI | MDI | MDI | MDI |
| Oxyalkylene group content (mol/kg) | 10.7 | 10.6 | 8.6 | 11.4 | 8.7 | 6.4 |
| Urea bond content (mol/kg) | 0 | 0 | 0 | 0 | 0 | 0 |
| Average particle diameter (μm) | 0.25 | 0.14 | 0.39 | 0.43 | 0.42 | 0.13 |
| Aqueous medium (B) | Water | Water | Water | Water | Water | Water |
| Evaluation of wear resistance | A | A | A | A | A | A |
| Evaluation of flexibility | A | A | A | A | A | A |

TABLE 2

|  | Example 7 | Example 8 | Example 9 | Comparative Example 1 | Comparative Example 2 | Comparative Example 3 |
|---|---|---|---|---|---|---|
| Aqueous polyurethane composition | (X-7) | (X-8) | (X-9) | (X'-1) | (X'-2) | (X'-3) |
| Acid value (mgKOH/g) Anionic polyurethane (A) | 12.6 | 12.9 | 12.5 | 7.1 | 11.8 | 10.8 |
| Composition | PTMG2000 | PTMG2000 PC | PTMG2000 PEs | PTMG4000 | PTMG2000 PEs | PTMG4000 |
|  | DMPA | DMPA | DMPA | DMPA | DMPA | DMPA |
|  | EG | EG | BG | EG | EG | EG |
|  |  |  |  |  |  | PZ |
|  | TDI | MDI | TDI | MDI | MDI | MDI |
| Oxyalkylene group content (mol/kg) | 11.3 | 8.0 | 8.4 | 12.4 | 2.7 | 9.7 |
| Urea bond content (mol/kg) | 0 | 0 | 0 | 0 | 0 | 0.24 |
| Average particle diameter (μm) | 0.19 | 0.32 | 0.24 | 0.57 | 0.67 | 0.83 |
| Aqueous medium (B) | Water | Water | Water | Water | Water | Water |
| Evaluation of wear resistance | A | A | A | C | A | A |
| Evaluation of flexibility | A | A | A | A | B | B | of 4 to 12 mol/kg and a urea bond content of 0.2 mol/kg or less, and an aqueous medium (B), wherein the anionic polyurethane (A) is the reaction product of a polyol containing polyoxyalkylene polyol, a glycol having a carboxyl group, a chain extender, and a polyisocyanate.

2. The glove according to claim 1, wherein the amount of the chain extender used is within a range of 0.01% to 8% by mass of the total mass of raw materials of the anionic polyurethane (A).

3. The glove according to claim 1, wherein the chain extender is ethylene glycol or butanediol.

4. The glove according to claim 1, wherein the polyisocyanate is diphenylmethane diisocyanate or toluene diisocyanate.

5. The glove according to claim 1, wherein the acid value of the aqueous polyurethane composition is within a range of 5 to 19 mgKOH/g.

6. The glove according to claim 1, wherein the average particle diameter of the anionic polyurethane (A) is within a range of 0.01 to 1 μm.

\* \* \* \* \*